D. DAVISON.
Cigar.
No. 48,527.
Patented July 4, 1865.
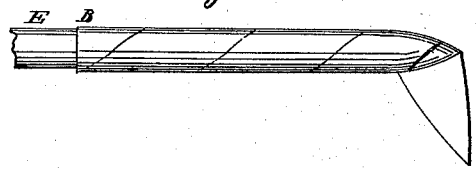
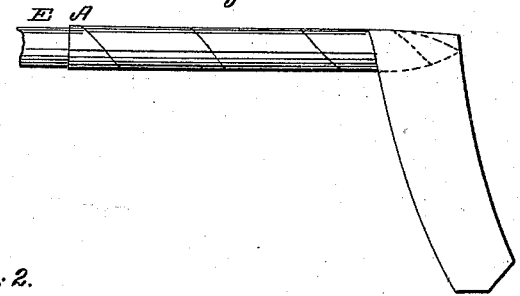
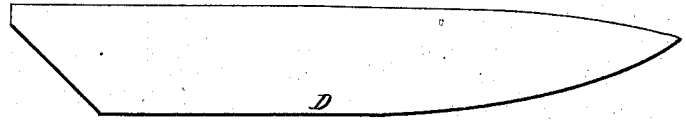
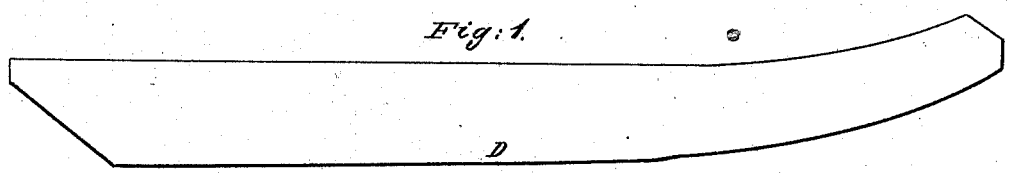
Witnesses:
Joseph Davison.
W. H. Wells.
Inventor:
Darius Davison.

UNITED STATES PATENT OFFICE.

DARIUS DAVISON, OF NEW YORK, ASSIGNOR TO OLIVER DAVISON, OF LANSINGBURG, N. Y.

IMPROVEMENT IN CIGARS.

Specification forming part of Letters Patent No. 48,527, dated July 4, 1865.

*To all whom it may concern:*

Be it known that I, DARIUS DAVISON, of the city, county, and State of New York, have invented a new and useful Mode of Forming and Making Cigars; and I do hereby declare that the following is a full and exact description thereof, reference being had to the accompanying drawings, and to the letters of reference marked thereon.

The nature of my invention consists, chiefly, in forming the outside wrappers or cases of cigars of two separate wrappers, made of any substance suitable for the purpose, and cut in a similar shape to Figures 1 and 2 in the accompanying drawings, and wound in opposite directions around a spindle with a cone-shaped end, to form a case or wrapper of a cigar shape, to be subsequently filled with tobacco, either cut or granulated, or prepared in any other suitable condition; also, perforating the cone-shaped end, so as to admit the smoke to pass through without the necessity of biting or cutting off the tip of the cone-shaped end of the cigar, and also perforating the center of the large end of the cigar to admit of its ready and even ignition when first lighted.

To enable others skilled in the art to form and make cigars in the manner I have invented, I will proceed to describe the method of the operation.

In the accompanying drawings, Fig. 1 represents the form of the inside wrapper, to be wound spirally around a spindle, as shown in Fig. 3, and to be wound one, two, three, or more times around the spindle at the cone-shaped end, and broken down at the cone-shaped end with the fingers while the spindle is being turned, so as to fit the cone-shaped end, as shown at K. The winding of the inside wrapper several times around the cone-shaped end is for the purpose of giving substance and strength to the cone-shaped end of the cigar when held in the mouth to be smoked. Fig. 1 is placed on the spindle with the diagonally-cut end at A, as shown in Fig. 3, and wound spirally toward the cone-shaped end and around the same, as before described.

Fig. 2 represents the form of the outside wrapper, to be wound spirally around the spindle over Fig. 1, as shown in Fig. 4, on the spindle. The diagonally-cut end of Fig. 2 is placed on the spindle at B in Fig. 4, and wound spirally toward the cone-shaped end of the spindle, in opposite directions to the winding thereon of Fig. 1, to give strength to the case and cause it to burn evenly, and at the cone-shaped end is wound and pasted down to fit the cone-shaped end, as shown in Figs. 4 and 5.

Fig. 5 shows a side view of the case when slipped from the spindle, completed, ready to be filled with tobacco in any prepared condition suitable for that purpose. The tobacco is to be filled in the case thus made at the open end at C, Fig. 5, in any suitable way, until the case is nearly full, and the end folded down upon the tobacco and pasted, so as to retain the tobacco therein. The end thus folded down is then punctured for the purposes before described, as shown in Fig. 6 at F, which is an end view of Fig. 5 at C when folded down and pasted.

Fig. 7 is an end view of the cone-shaped end, showing the puncture in the end at G, for the purposes before described.

In the drawings, K represents the first wrapper (shown in Fig. 1) after being wound spirally around and finished on the spindle, ready to receive the winding thereon of Fig. 2.

S represents Fig. 2 wound spirally over Fig. 1 on the spindle, completed, ready to receive the filling of tobacco after being slipped off the spindle.

H represents the completed cigar filled with tobacco, the end folded down and properly pasted, and the two ends properly punctured, ready for use. Figs. 1 and 2 are pasted on the whole of the edges (marked D D) on one side before being wound on the spindle, and the pasted edges or side is there overlapped on the other edge when wound around the spindle, so as to unite the whole surface continuously together, to give the case strength when completed and taken off the spindle to be filled with tobacco.

The wrappers Figs. 1 and 2 can be made either or both of tobacco-leaf, or any prepared paper to represent tobacco-leaf, or any other suitable substance, and can be made of the shape and proportions shown in Figs. 1 and 2, or in any other suitable shape, size, and proportions desired that will suit the size, shape, and proportions of the cigars desired to be made.

In Figs. 3 and 4, E E represent the end of the spindle broken off, upon which the case of the cigar is formed. The spindle can be fitted up in any suitable manner, so as to be turned around by hand or otherwise while winding the wrappers Figs. 1 and 2 thereon.

I do not claim the forming cases or wrappers of cigars on a spindle to be subsequently filled with tobacco.

What I claim as my invention, and desire to secure by Letters Patent, is as follows, viz:

1. Forming the wrappers or cases of cigars of two or more distinct pieces wound spirally around a spindle toward the cone-shaped end thereof in reverse directions one upon the other, and formed and finished at the cone-shaped end, substantially in the manner and for the purposes before described.

2. Combined as a whole, the making, forming, and finishing cigars, substantially as herein described.

DARIUS DAVISON.

Witnesses:
W. H. WELLS,
OLIVER DAVISON.